United States Patent
Boles

(10) Patent No.: US 7,308,051 B2
(45) Date of Patent: Dec. 11, 2007

(54) EFFICIENT SIGNAL DECODING FOR LOW-POWER APPLICATIONS

(75) Inventor: Colby Boles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/417,242

(22) Filed: Apr. 16, 2003

(65) Prior Publication Data

US 2004/0210675 A1  Oct. 21, 2004

(51) Int. Cl.
*H03D 1/00* (2006.01)

(52) U.S. Cl. .......................... 375/340; 704/270; 710/1; 710/100; 710/313; 713/320

(58) Field of Classification Search ................ 375/340; 704/270; 713/300, 320, 322, 323
See application file for complete search history.

(56) References Cited

U.S. PATENT DOCUMENTS 6,317,714 B1 * 11/2001 Del Castillo et al. ....... 704/270
6,467,042 B1 * 10/2002 Wright et al. ................ 713/320
6,535,110 B1    3/2003 Arora et al. ........... 340/310.01

OTHER PUBLICATIONS

Adams, N. et al., "An Infrared Network for Mobile Computers", *Proceedings of the Usenix Mobile and Location-Independent Computing Symposium*, 1993, 41-51.

Furusawa, S. et al., "Low-Cost and High Speed Optical Transceiver Using 850-nm VCSEL and Hard Polymer Clad Fiber", *OFC, Optical Fiber Communication Conference and Exhibit*, 1998, 2, 158.

Gfeller, F. et al., "A Robust Wireless Infrared System with Channel Reciprocity", *IEEE Communications Magazine*, 1998, 36(12), 100-106.

Hirt, W. et al., "IrDA-VFir (16 Mb/s): Modulation Code and System Design", *IEEE Personal Communications*, 2001, 8(1), 58-71.

Ingham, B.R., "IrDA Transceivers and Drivers for the Future Cordless Office", *Proceedings of the Fourth Annual Portable by Design Co.*, 1997, 311-317.

\* cited by examiner

*Primary Examiner*—David C. Payne
*Assistant Examiner*—Adolf DSouza
(74) *Attorney, Agent, or Firm*—Woodcock Washburn LLP

(57) ABSTRACT

A signal having a segment is received into a first device, and a segment is sampled before a predetermined match range to determine a first on or off status of the segment. A determination is made whether the first on or off status of the segment matches a first predetermined desired status and, if not, the decoding of the signal is terminated. The segment is sampled during the predetermined match range with circuitry to determine a second on or off status, and a determination is made whether the second on or off status of the signal matches the second predetermined desired status and, if so, causing the first device to perform a predetermined function with respect to a second device and, if not, terminating the decoding of the signal.

34 Claims, 5 Drawing Sheets

EFFICIENT SIGNAL DECODING FOR LOW-POWER APPLICATIONS

RELATED APPLICATIONS

This patent application relates to commonly assigned copending U.S. patent application Ser. No. 10/414,713, filed Apr. 16, 2003 and entitled "Format Independent Consumer IR Transceiver."

FIELD OF THE INVENTION

This invention relates in general to Infrared (IR) decoding in low-power applications. More particularly, the present invention relates to a hardware device implementing a decoding algorithm to decode an IR signal while consuming a minimum of power.

BACKGROUND OF THE INVENTION

A device operating on a low-power protocol, such as a Universal Serial Bus (USB) protocol, is sometimes required to maintain a certain level of functionality while operating at very low power levels. For example, a low power USB device, such as a device normally operating at a current of less than 100 mA, may be required to support a very low power state. In such a very low power state, such as a USB suspend state, the device may be required to consume as little energy as possible while maintaining the ability to resume full functionality in a higher power state. Such a very low power, or suspend, state is commonly referred to as a "sleep" state, and a process of causing the device to resume full functionality is commonly referred to as "waking" the device from sleep. In some protocols, an amount of current the device may consume while in a sleep state may be less than 500 µA averaged over 1 second.

As functionality is added to a sleep state of such a USB device, the amount of current consumed increases because of the increased power needed to provide the functionality. Therefore, if a method of conserving power is not utilized, other features within the device may need to be curtailed to allow the device to remain within the allotted power limitation of the low power state protocol. Also, some components of such a device may not be easily adaptable to reductions in power consumption, so reductions must be made in such processes or devices where power savings may be available.

A feature that may be added to a USB device is the ability to decode a signal from a remote control while the device is in the aforementioned sleep state. For example, a user may operate the remote control to "wake" the device from its low power sleep state. Typically, a code corresponding to a wake command is carried on an IR carrier frequency generated by the remote control, although other frequency ranges may be used. The device may read such an incoming IR signal to determine whether it contains the proper code for waking the device and thereby leaving the sleep state. In this way, the device may distinguish the wake code within the IR signal from other codes for the device, such as when a user pushes a button on the remote control that relates to a different, non-waking command. Also, the device may distinguish the proper code from codes for other devices.

An incoming IR signal typically has segments where each segment either has an IR carrier present, which indicates an "on" segment, or has no IR carrier present, which indicates an "off" segment. Each of the on or off segments may vary in duration in a predetermined manner. Typically, a device that is decoding an incoming IR signal while operating in a sleep state will measure the time duration of on or off segments in the received signal by sampling the input at regular intervals and comparing the input to a software reference signal. Some tolerance may be incorporated to account for remote timing variability and sampling error, and other sources of error.

Decoding circuitry within the device for sensing and decoding the incoming IR signal typically employs a segment matching process that decomposes the problem of identifying a proper IR signal by solving smaller matching problems. For example, the device looks at each on or off segment of the IR signal and determines if the segment is of approximately a correct time duration. If the time duration is correct, the device proceeds to the next segment. If the time duration is incorrect, the match fails and the device restarts the segment matching process from the beginning. Decoding an IR signal by matching on a segment-by-segment basis is less sensitive to systematic timebase variations between the remote control and the device than can be achieved by other methods such as correlating a IR signal against a reference template in a single step.

Conventional methods of decoding an IR signal, however, still consume too much power for many low-power protocols. Such conventional methods typically involve programming loops, data storage and/or numeric comparisons during the decoding process. Any of such methods involve additional processing steps that require increased processor speed to properly decode an IR signal. For example, the additional steps may include: storing state information, performing arithmetic operations and performing comparisons such as checking an IR signal value against a desired value. Such additional steps necessitate increased processor speed because a certain minimum sampling frequency must be maintained to properly decode an incoming signal. Accordingly, adding extra steps to the decoding process necessarily requires a processor to run the steps faster in order to be able to sample the signal at an appropriate rate. As may be appreciated, the power consumed by such a processor is typically directly proportional to the processor frequency, so the additional steps add to the power consumed by the device.

Accordingly, what is needed is a method for monitoring and decoding a signal that consumes as little power as possible. More specifically, what is needed is a method for decoding a signal that requires no loops, data storage or numeric comparisons, and therefore enables a lower processor speed, thereby reducing the power required by components performing the method.

SUMMARY OF THE INVENTION

In view of the above shortcomings, a method is disclosed herein for decoding a signal. A signal having a segment is received into a first device, and a segment is sampled before a predetermined match range with circuitry to determine a first on or off status of the segment. A determination is made whether the first on or off status of the segment matches a first predetermined desired status and, if not, the decoding of the signal is terminated. The segment is sampled during the predetermined match range with circuitry to determine a second on or off status, and a determination is made whether the second on or off status of the signal matches the second predetermined desired status and, if so, causing the first device to perform a predetermined function with respect to a second device and, if not, terminating the decoding of the signal. In some embodiments, the first and second device are the same device, and in other embodiments the first device is a peripheral device of the second device, which is a computer. In some embodiments the predetermined function is waking the second device from a sleep state.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

The present invention is directed to systems and methods for decoding an incoming signal in a power-efficient manner. The present invention may be implemented to decode any binary pattern, including signals of any frequency range, such as for example: IR, Ultra High Frequency (UHF), Very High Frequency (VHF) or the like. Devices compliant with USB protocols are suitable for use with the present invention, but other devices and protocols are compatible as well.

The present invention improves the ability of an electronic device to perform tasks during a low power state, or "sleep" state, such as for example decoding an incoming signal to determine if such signal contains a wake signal. Conventionally, decoding is performed by methods involving loops, data storage and/or numeric comparisons. Such tasks require additional clock cycles and therefore increase the processor speed required to decode the signal. Accordingly, the power consumed by a conventional system is increased because of the faster required clock speed.

The present invention provides a user with a means of decoding signals in a very power-efficient manner. A method and system is provided that measures code segments of a signal by the execution position of the process within a decoding method itself.

Exemplary Computing Environment

Figure 1:
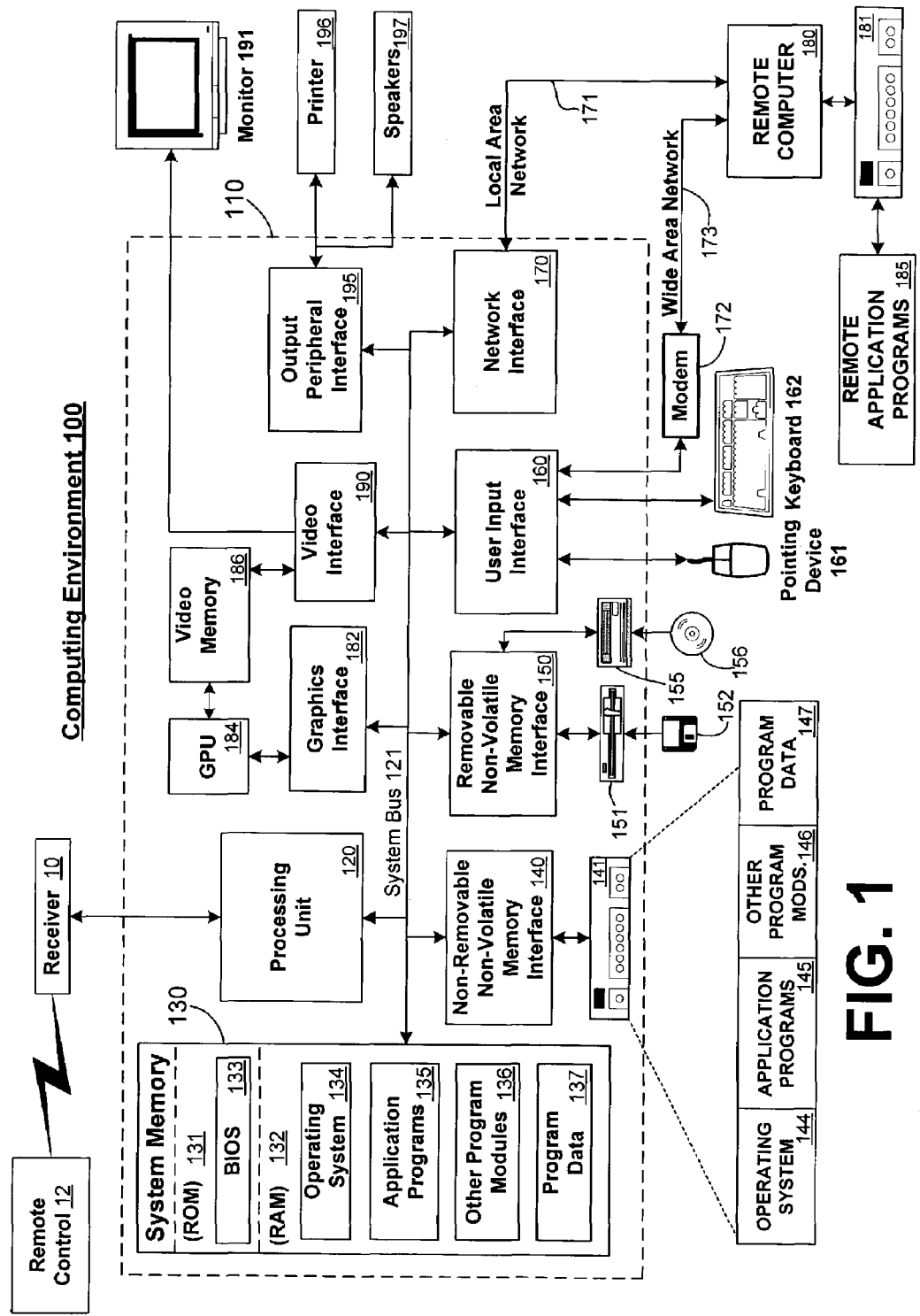
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

A hand-held remote control 12 (FIG. 1), a remote link on another computer 110, or the like, may transmit a wake signal to a receiver 10 (FIG. 1) to wake a device from a sleep state. The receiver may be an integrated component of the device, a peripheral, or the like. For example, the device may be computer 110, as shown in FIG. 1, and the receiver 10 may be an internal component of computer 110, or an external component connected to system bus 121 by way of user input interface 160, network interface 170 or the like. In either instance, it is to be appreciated that the device in the sleep state can likely provide only a limited amount of power to the receiver 10, and likely cannot provide any processing help to the receiver 10 in the course of processing the wake signal from the remote control 12. Accordingly, the receiver 10 likely must itself process the wake signal from the remote control 12 with the limited power available and with its own components, such as a processor or the like. Upon in fact detecting the wake signal, receiver 10 must notify the device that a wake signal has been received, again with the limited power available. Presumably, the device in the sleep state can at least receive the notification from the receiver 10, and can then transition from the dormant sleep state to a non-sleep state. Although an embodiment is discussed in the context of waking a device from a sleep state upon receiving a wake signal, it may be appreciated that an embodiment may be equally applicable to any application requiring binary pattern matching, whether or not the application is a low power application or receives a signal from a remote device.

Figure 2:
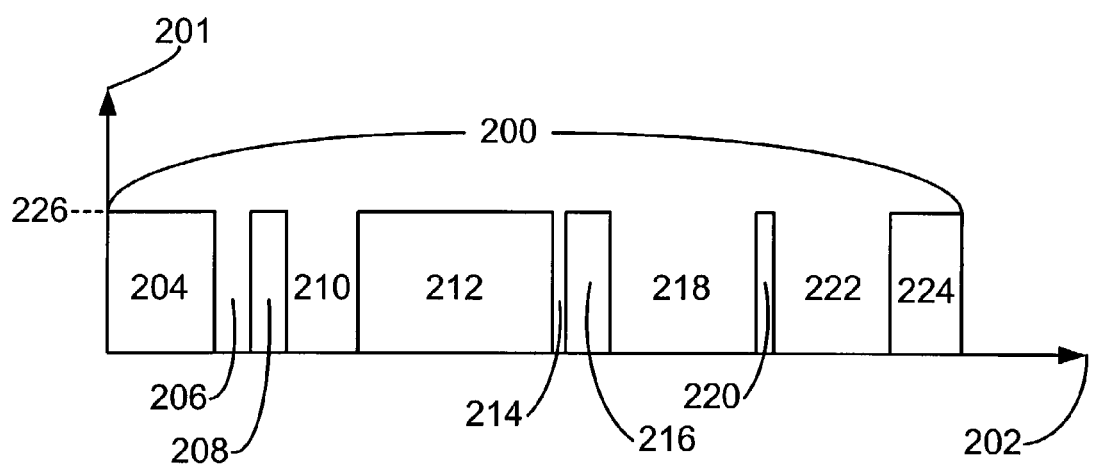
FIG. 2 is a timing diagram showing an example of an IR signal.

Referring now to FIG. 2, signal 200 varies in Radio Frequency (RF) intensity, represented by y-axis 201, over a given time, represented by x-axis 202. Signal 200 may be transmitted, for example, by a remote control device, a wireless computer component, or the like. Signal 200 comprises segments 204-224. Segments 204-224 vary in RF intensity between zero and a predetermined magnitude 226. In practical applications, such intensities may not be exactly zero or the predetermined magnitude 226, and may vary from such values because of a modulation method, transmission conditions, limitations of transmitting equipment, and the like. Signal 200 may comprise a carrier frequency that may be of any frequency range, such as for example IR, UHF, VHF or the like. In most remote control applications, however, IR signals are used, but any frequency range is consistent with the present invention. Segments 206, 210, 214, 218 and 222 are "off" segments with zero IR intensity, as indicated by a zero magnitude in y-axis 201. Segments 204, 208, 212, 216, 220 and 224 are "on" segments with non-zero IR intensity, as indicated by non-zero magnitude 226 in y-axis 201. As may be appreciated, signal 200 may have an offset intensity, meaning that the zero IR intensity segments 206, 210, 214, 218 and 222 may actually have a non-zero intensity, while the non-zero-intensity segments 204, 208, 212, 216, 220 and 224 may have an intensity that is offset by a predetermined magnitude 226 or the like. Segments 204-224 may, as shown in FIG. 2, may have a predetermined length as shown in x-axis 202. Also, each on segment 204, 208, 212, 216, 220 and 224 may be comprised of smaller sub-segments (not shown), such as may be the case if signal 200 is transmitted with a carrier frequency.

Figure 3:
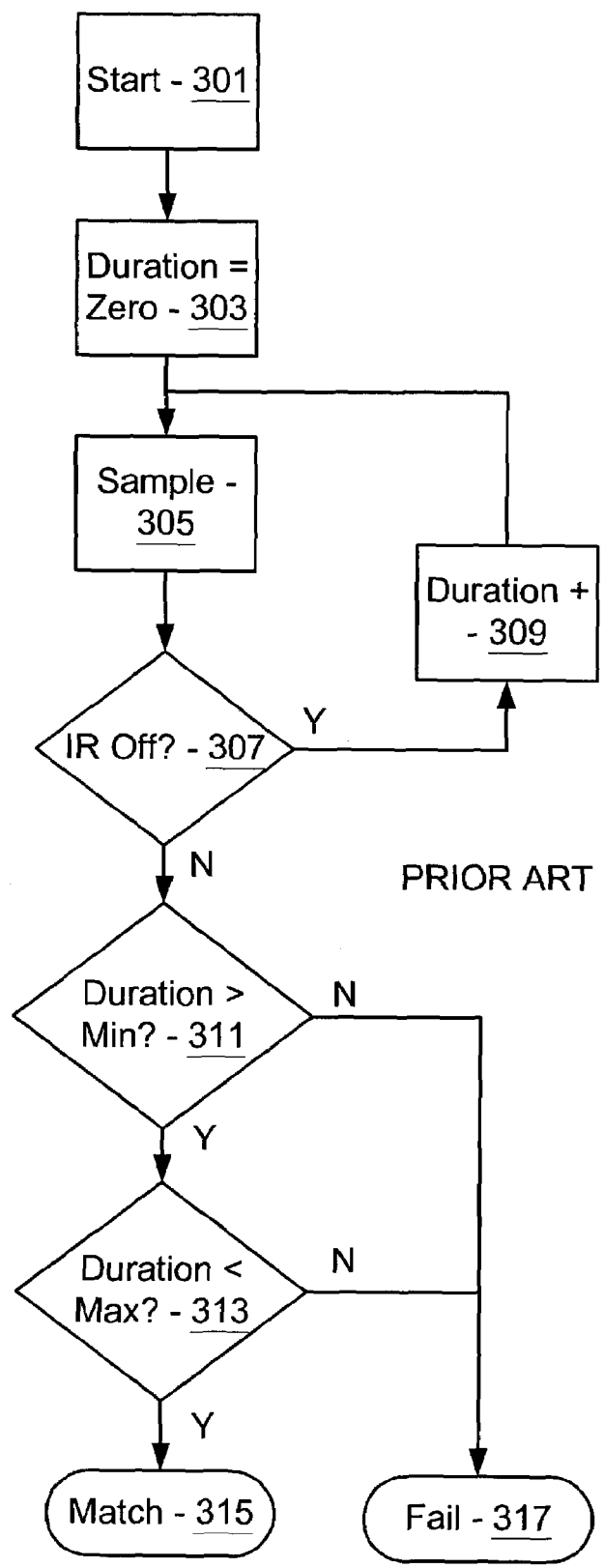
FIG. 3 is a flow chart illustrating a prior art IR signal decoding method.

Referring now to FIG. 3, a prior art method of matching an off segment, such as for example segment 206, 210, 214, 218 or 222, as part of a decoding process of incoming signal 200 is depicted. Each step of the method of FIG. 3 takes place according to a provided clock pulse. At step 301, the method begins to monitor signal 200 for an off segment thereof having a desired duration. At step 303, a segment duration counter is zeroed. Then, at step 305, signal 200 is sampled as being on or off. At step 307, if signal 200 is sampled as off, the segment duration count is increased (step 309) and the sampling process is repeated at step 305. If, however, at step 307, signal 200 is sampled as on, the off segment has completed and the method proceeds to steps 311 and 313, which carry out a bounding comparison. As should now be appreciated, the loop created by steps 305-309 is repeated for the duration of the off segment and, because each step takes place according to a predetermined number of clock pulses, each complete loop represents a predetermined time period.

At step 311, the duration of the segment, as measured by the segment duration counter in step 309, is compared with a desired minimum segment duration to determine if the measured segment is longer than the desired minimum. If the measured segment is not longer than the desired minimum duration, the process fails at step 317. If the measured segment is longer than the desired minimum duration, the system proceeds to step 313. At step 313, the duration of the segment is compared with a desired maximum segment duration to determine if the measured segment is shorter than the desired maximum. If the segment is longer than the desired maximum, the process fails at step 317. If the segment is shorter than the desired maximum, the process determines that the measured off segment is a match at step 315. Segments of varying lengths are processed by changing the desired minimum and maximum lengths to be applied in steps 311 and 313, respectively.

As may be appreciated, the prior art method of FIG. 3 requires several clock pulses after an off segment has ended before a result is determined at steps 315 or 317. For example, if at step 307 the segment was determined to be off, but in fact just turned on, the prior art method would need to proceed through step 309 to increase the segment duration count, step 305 to sample the segment, step 307 to determine that the segment is on, and pass both steps 311 and 313 before reaching a match at step 315—six or seven steps from the actual end of the off segment.

Once the process determines that the segment is a match at step 315, the process proceeds to a next segment matching code for the next segment, typically an on segment, employing the same basic algorithm. Such a process continues until the full code comprised of on and off segments is matched, at which point some predetermined action is taken. If a segment at any time fails to match, the entire process fails and the process repeats from the beginning upon receiving signal 200.

It may be appreciated that the present algorithm, as will be discussed in detail below in connection with FIG. 4B, pre-supposes two pieces of information. Firstly, the present algorithm pre-supposes that the off segment to be detected should have a predetermined length. That is, the present algorithm is being run within the context of a larger algorithm that is looking for a match between an incoming signal and a predetermined wake signal such as the signal 200 of FIG. 2, where the wake signal has a plurality of on and off segments including the off segment that is of interest to the present algorithm. Thus, the purpose of the present algorithm is to determine whether a particular off segment that is expected to be received by the larger algorithm is in fact the off segment that is presently being received, where such determination is made based on the measured duration of the off segment that is presently being received. If the duration is within a predetermined match range the larger algorithm may proceed with the expectation that the signal being received could in fact be the wake signal. If the duration is not within the match range, the larger algorithm may terminate with the knowledge that whatever the signal is that is being received, such signal is not in fact the wake signal.

Secondly, the present algorithm pre-supposes that each step therein is performed according to a set number of clock cycles. That is, the present algorithm is presumptively being run by the receiver 10 or the like by way of a processor therein, where such processor operates according to a clock running at a set frequency. As may be appreciated, each step in the present algorithm is represented by one or more processor instructions run by the processor, where each processor instruction takes one or more clock cycles. Thus, the present algorithm pays close attention to each processor instruction thereof and the number of clock cycles required for such processor instruction.

Figure 4A:
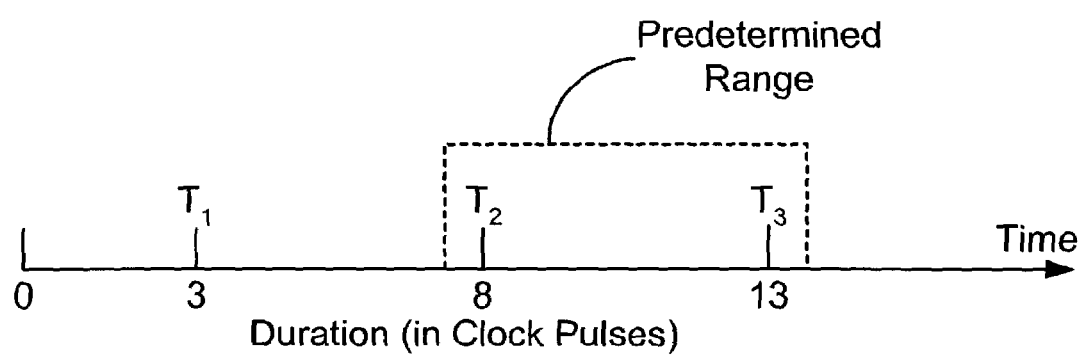
FIG. 4A is a timeline illustrating the occurrence of samples in accordance with one embodiment of the present invention.

Turning now to FIG. 4A, a timeline shows the location in time, in terms of exemplary clock pulses, of sampling times $T_1$, $T_2$ and $T_3$, as occurs in the present algorithm. Briefly, the present algorithm is a non-looping algorithm that at multiple times $T_1$, $T_2$ and $T_3$ samples the off segment for a transition to an on segment. As shown in FIG. 4A, sample times $T_1$, $T_2$ take place at 3, 8 and 13 clock pulses, respectively, as the algorithm is processed by receiver 10, although it may be appreciated that any number of clock pulses is consistent with an embodiment of the present invention. The samplings of the present algorithm may be divided into two distinct groups: one or more samplings that occur before the predetermined match range, such as at $T_1$ at 3 clock pulses; and one or more samplings that occur during the predetermined match range, such as at $T_2$ and/or $T_3$, at 8 and 13 clock pulses, respectively.

If any sampling before the predetermined match range, such as at $T_1$, detects that the transition to the on segment has newly occurred, then the off segment has a too-short duration and the present algorithm reports that the received signal fails to match the expected wake signal. Correspondingly, if any sampling during the predetermined match range, such as at $T_2$ and/or $T_3$, detects that the transition to the on segment has newly occurred, then the off segment has an in-range duration and the present algorithm reports that the received signal matches the expected wake signal. After the last sample within the predetermined range occurs without detecting the transition, which would be at $T_3$ in the example of FIG. 4B, it may be presumed that the off segment has a too-long duration and the present algorithm reports that the received signal fails to match the expected wake signal.

Figure 4B:
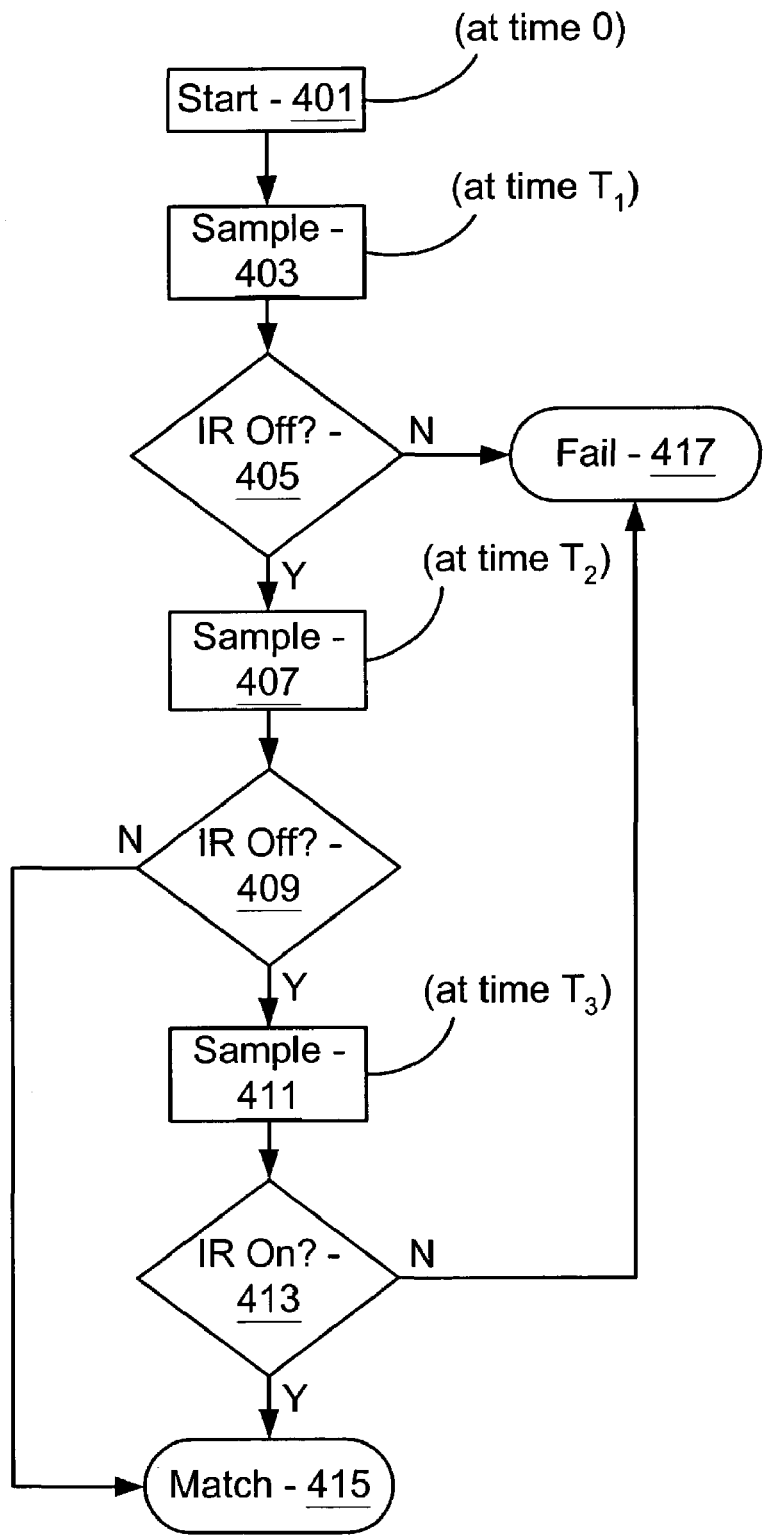
FIG. 4B is a flow chart illustrating an IR signal decoding method in accordance with one embodiment of the present invention.

Turning now to FIG. 4B, an example of a low-power decoding algorithm performed by receiver 10 in accordance with an embodiment of the present invention is disclosed. As was the case with the method of FIG. 3 above, each step of the method of FIG. 4 may take place according to one or more clock pulses provided the receiver 10. As may be appreciated, the clock pulses that elapse during the processing of FIG. 4B are exemplary, and as discussed above, any number of clock pulses is consistent with an embodiment of the present invention. As the details of fabricating a signal decoder or the like should be known to those of ordinary skill in the art, such details are omitted herein for clarity. As discussed above in connection with FIG. 2a, signal 200 may be an IR signal, or may be in any frequency range. In addition, the method of FIG. 4 may be employed in connection with any method of binary pattern matching, and is in no way limited to the waking of low-power devices by way of signal 200.

At step 401, and at time 0, the method of monitoring signal 200 for an off segment thereof comprising a desired duration begins. At step 403, and at time $T_1$ when 3 clock pulses have elapsed, signal 200 is sampled. At step 405, the process determines if signal 200 is off based on the sampling of step 403, and if not, the process fails at step 417. If, at step 405, the process determines that signal 200 is off, the process proceeds to step 407. At step 407, and at $T_2$ when 8 clock pulses have elapsed, which is in the predetermined match range as discussed above in connection with FIG. 4A, signal 200 is sampled. At step 409, the process determines if signal 200 is on or off based on the sampling of step 407. If signal 200 is on, the process indicates a match at step 415 because, as discussed in FIG. 4A, the off segment has an in-range duration. If signal 200 is off, the process proceeds to step 411.

At step 411, and at $T_3$ when 13 clock pulses have elapsed, which is also the last sample time in the predetermined match range for the example of FIG. 4B, signal 200 is sampled again. At step 413, the process determines if signal 200 is on or off based on the sampling of step 411. If signal 200 is off, the process fails at step 417 because it may be presumed that the off segment has a too-long duration. If signal 200 is on, the process indicates a match at step 415.

As discussed above in connection with FIG. 4A, the present algorithm is being run within the context of a larger algorithm that is looking for a match between an incoming signal and a predetermined wake signal. In such a case, several of the processes described in FIG. 4 may be connected in series, each process corresponding to an individual segment. Signal 200 may therefore be of any length and still remain consistent with the present invention. Such a process of decoding a plurality of segments continues until the full code comprised of on and off segments is matched, at which point the device may take a predetermined action, such as waking from its sleep state. In an embodiment, if a segment at any time fails to match, the entire process fails and the process repeats from the beginning upon receiving signal 200, and the device remains in its sleep state. In an alternate embodiment, a designated number of segments may fail without causing the entire process to fail.

As may be appreciated, the timing of clock pulses and the placement in time of time ranges within which samples should occur should be tailored to correspond very closely to the expected wake signal, otherwise a match will not result. Therefore, in some embodiments it may be desirable to place "dummy" commands or the like between processing each segment of a signal 200. Such dummy commands do not perform any function other than to take up time and therefore clock pulses. In this way, the exact spacing in time of signal 200 sampling may be maintained so as to more accurately process signal 200.

As can be seen by comparing the process of FIG. 4 to the process of FIG. 3, an embodiment consists of only a forward progression of input sampling and evaluation steps with no loops, data storage, or the like. Instead of measuring time through a combination of code execution speed and a counter variable as in the process of FIG. 3, time is measured by the execution position within the code itself, thereby providing equivalent functionality to the process of FIG. 3, except in a much more power-efficient manner. In other words, an embodiment unwinds the loop formed by steps 305, 307 and 313 and, in its place, substitutes the branching decisions of steps 405, 409 and 413. An embodiment also removes the duration comparisons of steps 311 and 313 by selectively placing the branching steps 405, 409 and 413 at positions within the process that are appropriate to the length of the segment being measured. Also, if a segment to be measured is longer than the segment measured by the process of FIG. 4, additional steps 405, 407 or the like may be added to account for this situation. Any number of additional steps may be added for any length of segment. Conversely, fewer steps may be used and such a configuration will remain consistent with the embodiment. Thus, an embodiment accommodates segments of varying lengths by permitting additional sampling and comparison steps such as 403 and 405, 407 and 409, and 411 and 413 to the process. An embodiment also effectively distributes the comparisons of steps 309 and 311 to segment-specific time points within the code. In other words, as the processing of the code progresses, an embodiment makes different branching decisions in steps 405, 409 and 413 for the same input. In this way an embodiment may accept a segment of a certain duration while rejecting other segments.

As may be appreciated, although the process of FIG. 4 is illustrated with respect to an off segment, simply changing steps 405 and 407 to determine whether the measured segment is on rather than off, and changing step 413 to determine whether the measured segment is off rather than on, will enable decoding of an on segment. Also, and as may be appreciated, the logic employed in the process of FIG. 4 may be performed in any equivalent way while remaining consistent with an embodiment. For example, if steps 405, 409 and 413 had both the condition for branching and the resulting branch reversed (e.g., step 405 determining whether the IR is on, and if so, failing at step 417), the functionality would remain identical.

In the event that an on segment of signal 200, which is to be processed by the algorithm of FIG. 4B, is comprised of multiple smaller sub-segments, such processing may be adapted appropriately to enable a proper state determination. For example, sampling may occur that has appropriate rectification circuitry to permit a state determination of the large segment formed by the smaller sub-segments. Accordingly, either on or off segments may be decoded with an embodiment, as an embodiment only requires a state change to operate, and the direction of the state change (i.e., on to off, or off to on) is irrelevant, as either are equally consistent with the embodiment.

Although an exact number and execution time of the instructions required to implement the processes of FIGS. 3 and 4 is processor dependent, it can be seen that the process of FIG. 4 is more efficient than the process of FIG. 3. For example, the process of FIG. 3 is able to sample the input every 3 instructions while the segment of signal 200 remains off which occurs, for example, during the progression through steps 307 and 313 before the process returns to the sampling step 305. Also there exists an additional 2 instruction delay—during the progression through the comparison steps 309 and 311—between samples every time a segment ends. In comparison, an embodiment is able to sample the input every 2 instructions with no additional delay, other than that which is desired to be added, for segment transitions. Such a reduction in the number of steps necessary to decode a binary signal, in one embodiment according to a USB sleep state protocol having a current consumption limit of 500 µA, results in the consumption of 50 µA of current using conventional circuitry. Such a low rate of current consumption, which is a considerable improvement over the current consumption of conventional methods, therefore provides the remaining 450 µA of available current consumption to other components and processes of receiver 10 or the like. As may be appreciated, other or new components may provide even greater current savings than the above-referenced embodiment, and embodiments of the present invention are in no way limited to a configuration that consumes 50 µA in the context of a 500 µA protocol, or any other amounts of current.

Thus, a method of decoding a binary signal in a very power-efficient manner is disclosed. While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Therefore, the present invention should not be limited to any single embodiment, but rather should be construed in breadth and scope in accordance with the appended claims.

What is claimed:

1. A method for decoding a signal having at least one segment comprising one of an on segment and an off segment, the segment having a temporal length demarcated by a temporal start time and a temporal end time and being judged to be a match if the temporal length of such segment is within a predetermined match range, the method comprising:

receiving the signal into a first device;

sampling the signal with circuitry at a first predetermined time after the temporal start time to determine if the temporal end time has occurred prior to such first predetermined time;

if the temporal end time has been determined to have occurred prior to such first predetermined time, determining that the temporal length of the segment is less than the predetermined match range and therefore that the segment is not a match, and terminating decoding of the signal;

if the temporal end time has been determined not to have occurred prior to such first predetermined time, proceeding by sampling the signal with circuitry at a second predetermined time after the first predetermined time to determine if the temporal end time has occurred prior to such second predetermined time and after the first predetermined time;

if the temporal end time has been determined to have occurred prior to such second predetermined time and after the first determined time, determining that the temporal length of the segment is within the predetermined match range and therefore that the segment is a match, and causing the first device to perform a predetermined function with respect to a second device;

if the temporal end time has been determined not to have occurred prior to such second predetermined time and after the first determined time, proceeding by sampling the signal with circuitry at a third predetermined time after the second predetermined time to determine if the temporal end time has occurred prior to such third predetermined time and after the second predetermined time;

if the temporal end time has been determined to have occurred prior to such third predetermined time and after the second determined time, determining that the temporal length of the segment is within the predetermined match range and therefore that the segment is a match, and causing the first device to perform the predetermined function with respect to the second device;

if the temporal end time has been determined not to have occurred prior to such third predetermined time and after the second determined time, determining that the temporal length of the segment is greater than the predetermined match range and therefore that the segment is not a match, and terminating decoding of the signal.

2. The method of claim 1, wherein the first device and the second device are the same device.

3. The method of claim 1, wherein the first device is a peripheral device.

4. The method of claim 1, wherein the second device is a computer.

5. The method of claim 1, wherein the segment is a first segment, and the predetermined function is decoding a second segment.

6. The method of claim 1, wherein the predetermined function is waking the second device from a sleep state.

7. The method of claim 1, wherein the predetermined function is waking the second device from a USB sleep state.

8. The method of claim 1, wherein the signal is wirelessly transmitted.

9. The method of claim 8, wherein the signal is an infrared signal.

10. The method of claim 1, wherein the segment is an on segment.

11. The method of claim 1, wherein the segment is an off segment.

12. The method of claim 1, wherein the segment has a plurality of smaller segments, and wherein sampling further comprises sampling the smaller segments, and determining the segment from the sampled smaller segments.

13. A computer-readable medium having computer-executable instructions thereon for performing a method for decoding a signal having at least one segment comprising one of an on segment and an off segment, the segment having a temporal length demarcated by a temporal start time and a temporal end time and being judged to be a match if the temporal length of such segment is within a predetermined match range, the method comprising:

receiving the signal into a first device;

sampling the signal with circuitry at a first predetermined time after the temporal start time to determine if the temporal end time has occurred prior to such first predetermined time;

if the temporal end time has been determined to have occurred prior to such first predetermined time, determining that the temporal length of the segment is less than the predetermined match range and therefore that the segment is not a match, and terminating decoding of the signal;

if the temporal end time has been determined not to have occurred prior to such first predetermined time, proceeding by sampling the signal with circuitry at a second predetermined time after the first predetermined time to determine if the temporal end time has occurred prior to such second predetermined time and after the first predetermined time;

if the temporal end time has been determined to have occurred prior to such second predetermined time and after the first determined time, determining that the temporal length of the segment is within the predetermined match range and therefore that the segment is a match, and causing the first device to perform a predetermined function with respect to a second device;

if the temporal end time has been determined not to have occurred prior to such second predetermined time and after the first determined time, proceeding by sampling the signal with circuitry at a third predetermined time after the second predetermined time to determine if the temporal end time has occurred prior to such third predetermined time and after the second predetermined time;

if the temporal end time has been determined to have occurred prior to such third predetermined time and after the second determined time, determining that the temporal length of the segment is within the predetermined match range and therefore that the segment is a match, and causing the first device to perform the predetermined function with respect to the second device;

if the temporal end time has been determined not to have occurred prior to such third predetermined time and after the second determined time, determining that the temporal length of the segment is greater than the predetermined match range and therefore that the segment is not a match, and terminating decoding of the signal.

14. The computer-readable medium of claim 13, wherein the first device and the second device are the same device.

15. The computer-readable medium of claim 13, wherein the first device is a peripheral device.

16. The computer-readable medium of claim 13, wherein the second device is a computer.

17. The computer-readable medium of claim 13, wherein the segment is a first segment, and the predetermined function is decoding a second segment.

18. The computer-readable medium of claim 13, wherein the predetermined function is waking the second device from a sleep state.

19. The computer-readable medium of claim 13, wherein the predetermined function is waking the second device from a USB sleep state.

20. The computer-readable medium of claim 13, wherein the signal is wirelessly transmitted.

21. The computer-readable medium of claim 20, wherein the signal is an infrared signal.

22. The computer-readable medium of claim 13, wherein the segment is an on segment.

23. The computer-readable medium of claim 13, wherein the segment is an off segment.

24. The computer-readable medium of claim 13, wherein the segment has a plurality of smaller segments, and wherein sampling further comprises sampling the smaller segments, and determining the segment from the sampled smaller segments.

25. A method for decoding an infrared signal having at least one segment comprising one of an on segment and an off segment, the segment having a temporal length demarcated by a temporal start time and a temporal end time and being judged to be a match if the temporal length of such segment is within a predetermined match range, the method comprising:

receiving the signal as transmitted by a remote control device at a component of a computer operating in a sleep state;

sampling the signal with circuitry at a first predetermined time after the temporal start time to determine if the temporal end time has occurred prior to such first predetermined time;

if the temporal end time has been determined to have occurred prior to such first predetermined time, determining that the temporal length of the segment is less than the predetermined match range and therefore that the segment is not a match, and terminating decoding of the signal;

if the temporal end time has been determined not to have occurred prior to such first predetermined time, proceeding by sampling the signal with circuitry at a second predetermined time after the first predetermined time to determine if the temporal end time has occurred prior to such second predetermined time and after the first predetermined time;

if the temporal end time has been determined to have occurred prior to such second predetermined time and after the first determined time, determining that the temporal length of the segment is within the predetermined match range and therefore that the segment is a match, and causing the computer to wake from the sleep state;

if the temporal end time has been determined not to have occurred prior to such second predetermined time and after the first determined time, proceeding by sampling the signal with circuitry at a third predetermined time after the second predetermined time to determine if the temporal end time has occurred prior to such third predetermined time and after the second predetermined time;

if the temporal end time has been determined to have occuned prior to such third predetermined time and after the second determined time, determining that the temporal length of the segment is within the predetermined match range and therefore that the segment is a match, and causing the computer to wake from the sleep state;

if the temporal end time has been determined not to have occurred prior to such third predetermined time and after the second determined time, determining that the temporal length of the segment is greater than the predetermined match range and therefore that the segment is not a match, and terminating decoding of the signal.

26. The method of claim 25, wherein the signal comprises a plurality of on and off segments.

27. The method of claim 25, wherein the sleep state is a USB sleep state.

28. The method of claim 25, wherein the component is integrated into the computer.

29. The method of claim 25, wherein the component is external to the computer.

30. A computer-readable medium having computer-executable instructions thereon for performing a method for decoding an infrared signal having at least one segment comprising one of an on segment and an off segment, the segment having a temporal length demarcated by a temporal start time and a temporal end time and being judged to be a match if the temporal length of such segment is within a predetermined match range, the method comprising:

receiving the signal as transmitted by a remote control device at a component of a computer operating in a sleep state;

sampling the signal with circuitry at a first predetermined time after the temporal start time to determine if the temporal end time has occuned prior to such first predetermined time;

if the temporal end time has been determined to have occurred prior to such first predetermined time, determining that the temporal length of the segment is less than the predetermined match range and therefore that the segment is not a match, and terminating decoding of the signal;

if the temporal end time has been determined not to have occurred prior to such first predetermined time, proceeding by sampling the signal with circuitry at a second predetermined time after the first predetermined time to determine if the temporal end time has occurred prior to such second predetermined time and after the first predetermined time;

if the temporal end time has been determined to have occurred prior to such second predetermined time and after the first determined time, determining that the temporal length of the segment is within the predetermined match range and therefore that the segment is a match, and causing the computer to wake from the sleep state;

if the temporal end time has been determined not to have occurred prior to such second predetermined time and after the first determined time, proceeding by sampling the signal with circuitry at a third predetermined time after the second predetermined time to determine if the temporal end time has occurred prior to such third predetermined time and after the second predetermined time;

if the temporal end time has been determined to have occurred prior to such third predetermined time and after the second determined time, determining that the temporal length of the segment is within the predetermined match range and therefore that the segment is a match, and causing the computer to wake from the sleep state;

if the temporal end time has been determined not to have occurred prior to such third predetermined time and after the second determined time, determining that the temporal length of the segment is greater than the predetermined match range and therefore that the segment is not a match, and terminating decoding of the signal.

31. The computer-readable medium of claim 30, wherein the signal comprises a plurality of on and off segments.

32. The computer-readable medium of claim 30, wherein the sleep state is a USB sleep state.

33. The computer-readable medium of claim 30, wherein the component is integrated into the computer.

34. The computer-readable medium of claim 30, wherein the component is external to the computer.

* * * * *